United States Patent [19]

Simpson, Jr. et al.

[11] Patent Number: 4,528,035

[45] Date of Patent: Jul. 9, 1985

[54] COMPOSITION AND PROCESS TO CREATE FOAMING SLAG COVER FOR MOLTEN STEEL

[75] Inventors: William B. Simpson, Jr.; David F. Lundy; R. L. Parnell; Charles W. Snodgrass; Edward B. Miller, all of Sand Springs; John M. Harvey, Tulsa, all of Okla.

[73] Assignee: Metro Materials Corporation, Tulsa, Okla.

[21] Appl. No.: 612,403

[22] Filed: May 21, 1984

[51] Int. Cl.³ .................................................. C22B 9/10
[52] U.S. Cl. .......................................... 75/257; 75/53
[58] Field of Search .................. 75/257, 53, 10–12; 148/26

[56] References Cited

U.S. PATENT DOCUMENTS

| | | | |
|---|---|---|---|
| 4,248,631 | 2/1981 | More | 75/257 |
| 4,447,265 | 5/1984 | Schwer | 75/257 |

Primary Examiner—Peter D. Rosenberg
Attorney, Agent, or Firm—Head, Johnson & Stevenson

[57] ABSTRACT

Slag formed in steel melt operations is foamed to create a protective cover using a composition comprised essentially of calcium oxide.

14 Claims, No Drawings

COMPOSITION AND PROCESS TO CREATE FOAMING SLAG COVER FOR MOLTEN STEEL

BACKGROUND OF THE INVENTION

1. Field of the Invention

The field of the invention is directed to the melting of steel and, in particular, to the foaming of slag to improve the steel making process.

2. Description of the Prior Art

Historically in open hearth steel making processes, the principal purpose of slag that forms on the surface of the molten steel is to remove undesirable impurities during the refining period after all of the components of the "charge" of ore, scrap or other steel sources had become molten. This so-called "basic practice" occurs by the introduction of burned lime (CaO) as one of the components of the furnace charge. Steel scrap, coke, some ores and hot metal from blast furnaces are other slag creation sources. A typical furnace is usually lined with a refractory made from the oxides of magnesium and chrome which have higher melting points than the charge materials. The slag and furnace lining, both being basic pH in nature, do not attack one another chemically. The molten steel is more or less neutral and only erodes the furance refractory from the high temperature and the movement of the molten steel during the furnace tap or emptying step.

With the advent of the electric arc furnace in steel making, furnace slag took on additional functions. The heat introduced inside the furnace is from the arc of typically three carbon electrodes creating temperatures estimated to be in excess of 6,000° Fahrenheit. This is much higher than the melting point of the furnace refractory, therefore after the scrap or raw steel charge is completely melted the sidewalls of the furnace are subject to exposure to this intense heat except for the portion of the arc that can be submerged below the slag cover that is created on top of the molten metal. The practice heretofore was to use an amount of lime (CaO) for sulphur and phosphorus removal and also to cover the arc as much as possible. Too much lime would slow the overall melt process time, since lime has a high melting point and also the resulting slag would be viscous in nature and would not remove the undesirable impurities effectively. This added function of the slag was to shield the furnace sidewalls from the effects of the electrode arc and insulate the molten bath from losing its temperature into the atmosphere via the furnace dust control evacuation system positioned above the furnace. The furnace operators would try to compromise their methods during the refining period by retarding the power input through the electrodes and shortening the arcs to keep them below the slag level. This would save on refractory wear but would lengthen refining times and consume more electrodes and kilowatts of electricity. Thus, melt shops had to determine practices which would economically obtain profitable end results by weighing furnace availability and refractory costs against electrode and kilowatt consumption as well as the time element to complete a steel melting process.

Others have considered the use of foaming agents to be added to the slag and a variety of products have entered the marketplace such as coke or some type of carbon product which is introduced into the furnace as the refining period was begun. Such prior foaming agents would increase the depth of the furnace slag as much as three-fold and hence, the arc would be completely submerged. The power factor was increased to a range never attained before with a longer arc and no damage occured to the furnace refractory as long as the foaming slag was maintained. The problem with using materials of the prior art is that the duration of the foaming action is relatively short and subsequent additions of foaming agent have to be made. This is accomplished by either shoveling carbon or coke materials into the door of the furnace or pneumatically injecting the material through a hole in the furnace sidewall above the slag line. This present method is labor intensive and costly of carbonaceous materials.

SUMMARY OF THE INVENTION

It is an object of this invention to provide a new foaming agent for slag that overcomes the problems heretofore experienced with the prior art materials including requirements for repeated applications of such materials.

It is a further object of this invention to provide a foaming slag that not only insulates the molten bath of steel from temperature loss during and after the refining process but also insulates the electric arc so that more of the heat generated at the electrode tip is being conducted into the molten bath. As a result, many irregularities of electric arc functions that occur from fluctuations of slag depth, tap setting changes, and other interruptions are eliminated with a smoother constant flow of power into the furnace bath. As a result maintenance problems, usually electrical, have been lessened between the transformer and the electrodes.

When the foaming agent and methods of this invention are utilized as a ladle cover, the molten bath of steel will maintain its molten condition for a longer period of time between the refining operation and the casting operation.

The invention is directed to a foaming agent that is introduced into the furnace slag after melt-down of the steel raw material. The foaming agent comprises essentially Calcium Oxide (CaO) and Carbon (C) particles.

DETAILED DESCRIPTION OF THE PREFERRED EMBODIMENT

Preferrably the agents of this invention are used in the following percent by weight and particle size ranges:

| Additive | Weight % | Particles Size-Std Screen | Preferred Particle Sizes |
|---|---|---|---|
| CaO | 50–85% | at least 50% pass 150 mesh and retained on 200 mesh | 75% pass 150 mesh retained on 200 mesh |
| C | 50–15% | at least 50% retained on 100 mesh | 88% retained on 100 mesh |

A source of CaO for use in the process comes from the dust collected from a cement kiln operation and although the collected material contains other compounds, these are not now believed to be absolutely necessary to the practice of the invention although it is recognized that they may have some beneficial effect. Such other compounds include: Magnesium Oxide (MgO), Silicon Dioxide ($SiO_2$), Sulphur (S) and other traces of oxides including Aluminum Oxide ($Al_2O_3$), Ferric Oxide (Fe$_2$O$_3$), Titanium Dioxide (TiO$_2$), Phophorous Oxide (P$_2$O$_5$) and Manganese Oxide (Mn$_3$O$_4$).

A source of Carbon includes but is not limited to petroleum coke and coal particles.

Thus a typical analysis of the foaming agent of this invention will comprise:

68.0%—Calcium Oxide (CaO)
17.5%—Free Carbon (C)
4.1%—Magnesium Oxide (MgO)
3.7%—Silicon Dioxide (SiO$_2$)
1.3%—Sulphur (S)
2.6%—Other trace Oxides Depending upon the carbon level of the molten steel bath 50-500 pounds of the above composition is added for a furnace melt or heat size of 85 ton capacity. Heats containing lower carbon, e.g. below 0.10%, require more foaming agent.

The composition set forth above is introduced into the slag immediately after the first preliminary lab sample has been taken from the melt and the slag door has been cleared of scrap. Every effort is made to retain the foaming slag upon the molten steel by tilting the furnace back so as to create freeboard and place the level below the slag door. The foaming slag ranges from 8 to 16 inches thick. If the foaming slag is allowed to run off through the slag door the benefit of the foaming action to submerge the arc will be lost.

Examples of typical heats utilizing the invention are set forth below:

EXAMPLE 1

A 208,000 lb. heat in an electric arc furnace was formed of melted steel and shredded scrap. 6,000 lbs. of Burnt Lime and 700 lbs. of coke were introduced in the first charge to the furnace. After analysis and addition of 300 lbs. of lime, 1450 lbs. of SiMn and other additives to the furnace, there was no noticeable foam cover. 50 lbs. of foaming agent No. MM5A was added and a good foam cover was formed. Because additional carbon had to be added to the melt, most of the foam cover was lost through the furnace door. 11 minutes later another 125 lbs. of agent No. MM5A was added creating a stable foam cover. MM5A was comprised of 200 lbs. of dry lime from a local cement kiln operation and 50 lbs. of coke 'breeze' (particle size 325 mesh to $\frac{3}{8}$" diameter).

Upon completion, the melt was then poured into the ladle. More than enough of the furnace foam cover was transferred to become the ladle cover. The ladle was then positioned over a continuous billet casting operation. The foam cover essentially held the temperature of the molten steel for the thirty seven (37) minutes required to empty the ladle. Temperature loss experience was between 0.5 and 0.75° F. per minute. By comparison an unprotected ladle would have experienced losses ranging from 3° to 45° F. per minute.

EXAMPLE 2

In a similar heat, calcined fluid coke was substituted for the coke 'breeze' of Example No. 1. 175 lbs. were used resulting in a good foam cover.

EXAMPLE 3

After melt of a charge of high carbon steel (0.18%) the furnace slag condition was about 6" to 8" deep. One 50 lb. sack of test foaming agent mix No. MM2B was added and the furnace foam height increased to total height of 18" to 24". After additions of carbon to the melt to meet the steel requirements, much of the foamed slag was lost. Another 50 lb. sack of MM2B was added about the time of the manganesium silicate addition to the melt. Increased foam was observed back to the original height. MM2B was comprised of a mixture of 250 lbs. CaO, 54 lbs. of SiO2 and 100 lbs. of carbon, plus MgO, S and other trace oxides of the source material.

Additional and unexpected beneficial results have occured. Prior to the utilization of the composition of this invention, it was not unusual to see a reversion of phosphorous and sometime sulphur following the furnace alloy addition of silico-manganese into the bath. This was a result of a change of oxidizing to a reducing condition at the time of the addition. The foaming slag agent of this invention and method has the ability to retain the phosphorous and sulphur and even lower these levels in the finished steel.

In addition, the foaming slag, as a result of the addition of the composition of this invention, has been found to be an excellent ladle cover when used in melt shops with continuous casting facilities. In some steel making operations it is a criterion that the molten steel shall not lose more than one-half degree Fahrenheit per minute, while the heat of steel is being continuously cast. It has been found that a foaming agent cover of this invention maintains this or better criteria.

The term "mixture" as used herein includes not only premix compositions but also in-situ, i.e. inside the furnace, mixing of separately introduced components. p It has been found that the foaming agent of this invention operates best when the amount of infoamed slag is from 4" to 8" atop the molten steel. Of course, the formation of slag is a function of the amount of and stage of the melt cycle, when slag producing materials such as lime and mill scale (Fe$_2$O$_3$), etc., are introduced.

What is claimed is:

1. A method of foaming the slag generated in a steel making electric arc furnace after melt-down of steel raw material comprising the steps of:
   when the amount of said slag atop said melted steel is at least 4 inches deep, introducing a foaming agent into the furnace slag, the composition of said agent comprising essentially calcium oxide (CaO) and free carbon (C) particles.

2. The method of claim 1 wherein said CaO is present within the range of 50-85% by weight with Carbon (C) present within the range of 50-15% by weight.

3. The method of claim 2 wherein the said CaO is of particle size to have at least 50% passing a 150 mesh standard screen and retained on a 200 mesh standard screen, with said Carbon having at least 50% retained on a 100 mesh standard screen.

4. The method of claim 3 wherein said CaO particle size has 75% passing a 150 mesh screen and retained on a 200 mesh screen, with 88% of said C retained on a 100 mesh screen.

5. The method of claim 1 wherein said composition includes Silica (SiO$_2$).

6. The method of claim 5 wherein said composition comprises 62.5% CaO, 25% C and 12.5% SiO$_2$.

7. The method of claim 5 wherein said composition comprises 50-85% CaO, 15-50% C and 0-35% SiO$_2$.

8. A method of foaming the slag generated in a steel making electric arc furnace after melt-down of steel raw material comprising the steps of:
   when the amount of said slag atop said melted steel is at least 4 inches deep, introducing a foaming agent into the furnace slag the composition of said agent comprising a mixture of:

68% calcium oxide, 4.1% magnesium oxide, 17.5% free carbon, 3.7% silicon dioxide, 1.3% sulphur and miscellaneous oxides from the group consisting of $AL_2O_3$, $FE_2O_3$, $TiO_2$, $P_2O_5$, and $MN_3O_4$.

9. A composition for foaming the slag in molten steel comprising a mixture of essentially calcium oxide (CaO), and free carbon (C) and Silica ($SiO_2$).

10. A composition of claim 8 wherein the method of claim 1 wherein said CaO is present within the range of 50–85% by weight with C present within the range of 50–15% by weight.

11. The method of claim 9 wherein the said CaO is of particle size to have at least 50% pass a 150 mesh standard screen and be retained on a 200 mesh standard screen, with said C having at least 50% retained on a 100 mesh standard screen.

12. A composition of claim 10 wherein said CaO particle size has 75% passing a 150 mesh screen and retained on a 200 mesh screen, with 88% of said C retained on a 100 mesh screen.

13. A composition of claim 12 wherein said composition comprises 62.5% CaO, 25% C and 12.5% $SiO_2$.

14. A composition of claim 12 wherein said composition comprises 50–85% CaO, 15–50% C and 0–35% $SiO_2$.

* * * * *